US010969057B2

(12) United States Patent
Hung

(10) Patent No.: US 10,969,057 B2
(45) Date of Patent: Apr. 6, 2021

(54) CANTILEVER DEVICE AND HYDRAULIC SYSTEM THEREOF

(71) Applicant: ModernSolid Industrial Co., Ltd., Taichung (TW)

(72) Inventor: Chin Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/938,237

(22) Filed: Jul. 24, 2020

(65) Prior Publication Data

US 2020/0355320 A1 Nov. 12, 2020

Related U.S. Application Data

(62) Division of application No. 16/011,174, filed on Jun. 18, 2018, now Pat. No. 10,738,940.

(30) Foreign Application Priority Data

Jun. 27, 2017 (TW) .................................. 106209366

(51) Int. Cl.
| *F16M 11/06* | (2006.01) |
| *F16M 13/02* | (2006.01) |
| *F16M 11/20* | (2006.01) |
| *F16M 11/04* | (2006.01) |
| *F16M 11/24* | (2006.01) |
| *F16M 11/10* | (2006.01) |

(52) U.S. Cl.
CPC ........ *F16M 13/022* (2013.01); *F16M 11/046* (2013.01); *F16M 11/048* (2013.01); *F16M 11/2014* (2013.01); *F16M 11/2021* (2013.01); *F16M 11/24* (2013.01); *F16M 11/06* (2013.01); *F16M 11/10* (2013.01); *F16M 2200/041* (2013.01); *F16M 2200/044* (2013.01); *F16M 2200/063* (2013.01)

(58) Field of Classification Search
USPC ....... 248/123.11, 123.2, 124.1, 125.1, 125.2, 248/125.7, 162.1, 404, 405, 157
See application file for complete search history.

(56) References Cited

U.S. PATENT DOCUMENTS

| 5,743,503 A | 4/1998 | Voeller et al. |
| 5,975,472 A | 11/1999 | Hung |
| 6,955,328 B2 | 10/2005 | Oddsen |
| 7,540,457 B2 | 6/2009 | Oddsen et al. |
| 8,366,060 B2 | 2/2013 | Hung |
| 2010/0127144 A1 | 5/2010 | Lange et al. |

(Continued)

*Primary Examiner* — Alfred J Wujciak
(74) *Attorney, Agent, or Firm* — Perkins Coie LLP

(57) ABSTRACT

The present disclosure provides a hydraulic system of a cantilever device, which comprises an end cap, an adjustment brace, an adjustment bolt, a slider, and an upper pivot. The end cap comprises an upper wall, a bottom wall, and side walls. The bottom wall has a securing groove. Each side wall has an upper pivot hole adjacent to the upper wall. The adjustment brace is fastened to the end cap and is secured in the securing groove. The slider comprises a first slider portion and a second slider portion, wherein the first slider portion has two shaft portions located on both sides of the adjustment portion. The upper pivot comprises a shaft body portion located between the bolt head and the bolt shoulder of the adjustment bolt.

12 Claims, 8 Drawing Sheets

(56) References Cited

U.S. PATENT DOCUMENTS

| | | |
|---|---|---|
| 2011/0260017 A1 | 10/2011 | Monsalve et al. |
| 2011/0315843 A1* | 12/2011 | Hung .................. F16M 11/041 248/279.1 |
| 2012/0032062 A1* | 2/2012 | Newville ........... F16M 11/2092 248/575 |
| 2012/0235000 A1* | 9/2012 | Borloz ................ F16M 11/046 248/284.1 |
| 2013/0009034 A1 | 1/2013 | Fallows et al. |
| 2015/0189991 A1 | 7/2015 | Yang et al. |
| 2015/0308610 A1 | 10/2015 | Zhao et al. |
| 2018/0112860 A1 | 4/2018 | Hung et al. |

\* cited by examiner

CANTILEVER DEVICE AND HYDRAULIC SYSTEM THEREOF

CROSS-REFERENCE TO RELATED APPLICATION

This application is a divisional of U.S. patent application Ser. No. 16/011,174 filed with the U.S. Patent and Trademark Office on Jun. 18, 2018, which claims the benefit under 35 U.S.C. § 119 to application Ser. No. 10/620,9366, filed in the Taiwan Patent Office on Jun. 27, 2017.

RELATED FIELD

The present disclosure relates to a hydraulic system, particularly to a hydraulic system of a cantilever device.

BACKGROUND

With reference to FIGS. 1 and 2, a hydraulic system 9 of a cantilever device as disclosed in U.S. Pat. No. 7,540,457 is suitable for connecting a top support (not shown) to a bottom support (not shown) of the cantilever to a force adjustment device (not shown). The force adjustment device may be a gas spring or an oil force adjustment device. The force adjustment device 9 includes an end cap 92 that can be inserted in a base 91 and has an opening 920, an adjustment bolt 93 rotatably arranged on the end cap 92, a slider 94 having a first end 941 and a second end 942, a fixing plate 95, two bolts 96, an upper pivot 97 for pivoting the top support to the end cap 92, and a lower pivot 98 for pivoting the bottom support to the end cap 92.

The end cap 92 comprises an upper wall 921, a bottom wall 922, a stopping wall 923 that connects the upper wall 921 to the bottom wall 922, and two side walls 924 that connect the upper wall 921 to the bottom wall 922 and are located on both sides of the stopping wall 923. The edge of the upper wall 921, the edge of the bottom wall 922 and edges of the side walls 924 are jointly surrounded for defining the opening 920. The upper wall 921 has an internal surface 925 facing the bottom wall 922, an external surface 926 opposite to the internal surface 925, and a through hole 927 passing through the internal surface 925 and the external surface 926 and receiving a bolt head 931 of the adjustment bolt 93. The bottom wall 922 has a top surface 951, two joint portions 952 that are respectively located on both sides of the stopping wall 923 and protrude from the upper surface 951 toward the upper wall 921, a connecting portion 953 that are located between the joint portions 952 and protrudes from the upper surface 951 toward the upper wall 921, and a groove 954 formed in the connecting portion 953 and for receiving a distal portion 932 of the adjustment bolt 93. Each side wall 924 has an upper pivot hole 961 adjacent to the upper wall 921, and a lower pivot hole 962 adjacent to the bottom wall 922.

In assembling, the first end 941 of the slider 94 is screwed to an adjustment portion 933 of the adjustment bolt 93, and a bolt shoulder 934 of the adjustment bolt 93 is abutted against the internal surface 925 of the upper wall 921 (at this time, the end 932 of the adjustment bolt 93 is received in the groove 954 of the bottom wall 922); then the bolts 96 are respectively passed through the fixing plate 95 and are locked to the joint portions 952 of the end cap 92; then the second end 942 of the slider 94 is pivoted to one of the ends (not shown) of the force adjustment device and the other end (not shown) of the force adjustment device is pivoted to the top support; and finally the upper pivot 97 is passed through the upper pivot hole 961 of the end cap 92 and an end (not shown) of the top support, and a lower pivot 98 is passed through the lower pivot hole 962 of the end cap 92 and the end (not shown) of the bottom support. Additionally, both the other end of the top support and the other end of the bottom support are pivoted to a connector piece (not shown) that is opposite to the end cap 92 such that the preliminary assembling work of the cantilever device can be completed.

Such a hydraulic system 9 enables a user to axially move the slider 94 up and down along the direction of the adjustment bolt 93 by rotating the adjustment bolt 93. An angle between the force adjustment device and the top support is changed and thus the overall load capacity of the force adjustment device is adjusted. However, in practice, such a hydraulic system 9 has the following disadvantages:

First, in order to allow the adjustment bolt 93 to be limited within the end cap 92, the method disclosed in the above prior art adopts a design in which the end 932 of the adjustment bolt 93 is abutted against the top surface 951 of the bottom wall 922 (for preventing the adjustment bolt 93 from falling downward) and an external diameter of the bolt shoulder 934 of the adjustment bolt 93 is made to be larger than an external diameter of the bolt head 931 (for preventing the adjustment bolt 93 from falling outward from the through hole 927). Therefore, it should be appreciated that, when the user rotates the adjustment bolt 93, a feeling that the rotation is less smooth exists because the end 932 of the adjustment bolt 93 is abutted against the upper wall 921. Therefore, in general, the end 932 of the adjustment bolt 93 is additionally processed to obtain a smooth surface and is preferably designed to be tapered so as to minimize the contact area between the adjustment bolt 93 and the bottom wall 922, thereby reducing the friction force. Namely, the design of the adjustment bolt 93 and the end cap 92 of the hydraulic system 9 is sophisticated and complicated, which results in a disadvantage that the manufacturing cost cannot be reduced.

Second, the slider 94 of the hydraulic system has only one guiding bevel 943 abutting against the stopping wall 923, and the slider 94 is not limited and fixed between the side walls 924. Therefore, when the user rotates the adjustment bolt 93 to axially move the slider 94 up and down along the direction of the adjustment bolt 93, the slider 94 will shake between the side walls 924, resulting in unnecessary noise. Also, when the force adjustment device changes a free end position of the cantilever device due to external force, unnecessary abnormal friction noise may be produced between the force adjustment device and other components (such as the top support or the bottom support) as the slider 94 that connects the force adjustment device shakes. Additionally, when the force adjustment device applies force onto the slider 94 because of the angle change and then the force is transmitted to the adjustment bolt 93, the end 932 of the adjustment bolt 93 will naturally deviate toward the direction of the opening 920 due to the generation of torque which requires the hydraulic system 9 to have a fixing plate 95 to limit the end 932 of the adjustment bolt 93 to the groove 954 of the bottom wall 922.

As described above, in order to achieve a stable operation of the force adjustment device while using such a hydraulic system 9, the fitting relationship between the essential elements of the hydraulic system 9 needs to be complicated and many essential elements are required, and thus, the overall manufacturing cost cannot be reduced.

SUMMARY

Therefore, one object of the present disclosure is to provide a hydraulic system of a cantilever device capable of achieving stable action of a force adjustment device and simplifying assembling steps.

Thus, the hydraulic system of the cantilever device of the present disclosure can be used to connect a top support to a force adjustment device of the cantilever device. The hydraulic system includes an end cap having an opening, an adjustment brace, an adjustment bolt, a slider, and an upper pivot.

The end cap comprises an upper wall and an bottom wall fitted to define the opening, and two side walls arranged oppositely and connecting the upper wall to the bottom wall. The upper wall has a through hole communicating with the opening. The bottom wall has a securing groove communicating with the opening. Each side wall has an upper pivot hole adjacent to the upper wall.

The adjustment brace passes through the opening and is secured in the securing groove of the end cap. The adjustment brace comprises a top surface fastened to the end cap and two track surfaces connecting the top surface and spaced apart. Each track surface has a track slot.

The adjustment bolt sequentially comprises a bolt head, a bolt neck, a bolt shoulder and an adjustment portion. The adjustment portion is located between the track surfaces. The slider comprises a first slider portion screwed to the adjustment portion and a second slider portion connecting the first slider portion to the force adjustment device. The first slider portion has two shaft portions located on both sides of the adjustment portion. The shaft portions move up and down on the track slots respectively along with rotation of the adjustment bolt.

The upper pivot is used to pivot an end of the top support to the end cap. The upper pivot comprises a shaft body portion located between the bolt head and the bolt shoulder of the adjustment bolt and two shaft end portions located on both sides of the shaft body portion respectively and passing through the upper pivot holes respectively.

According to the effect of the hydraulic system of the cantilever device of the present disclosure, through a design where the adjustment brace is fastened to the end cap and secured in the securing groove and each track surface of the adjustment brace has a track slot, the shaft portions of the first slider portion of the slider are configured to move up and down axially only along the adjustment bolt and not to be shaken between the side walls when rotating with the adjustment bolt so as to improve a situation where the current force adjustment device cannot act stably. Furthermore, according to a design where the shaft body portion of the upper pivot is located between the bolt head and the bolt shoulder of the adjustment bolt, the purpose of securing the adjustment bolt only at the end cap can be reliably achieved so as to eliminate additional processing of the end of the current adjustment bolt for a smooth surface. This way, the hydraulic system of the cantilever device also contributes to reducing the manufacturing costs.

Another object of the present disclosure is to provide a cantilever device adopting the above hydraulic system.

Thus, the cantilever device of the present disclosure comprises a top support, a force adjustment device, a hydraulic system according to description above, and a connector piece.

The top support comprises two ends arranged oppositely and a pivot located between the ends.

The force adjustment device comprises two ends arranged oppositely, and one of the ends is pivoted at the pivot of the top support.

The end cap of the hydraulic system is rotatably arranged on the base. The slider is connected to the other end of the force adjustment device. The upper pivot is used to pivot one of the ends of the top support to the end cap.

The connector piece is used to connect to the tilter assembly. The connector piece is opposite to the end cap of the hydraulic system and is pivoted to the other end of the top support.

The effect of the cantilever device of the present disclosure is the same as the effect of the above hydraulic system.

BRIEF DESCRIPTION OF THE DRAWINGS

Other features and effects of the present disclosure will be clearly presented in the embodiments with reference to drawings.

DETAILED DESCRIPTION

Figure 1:
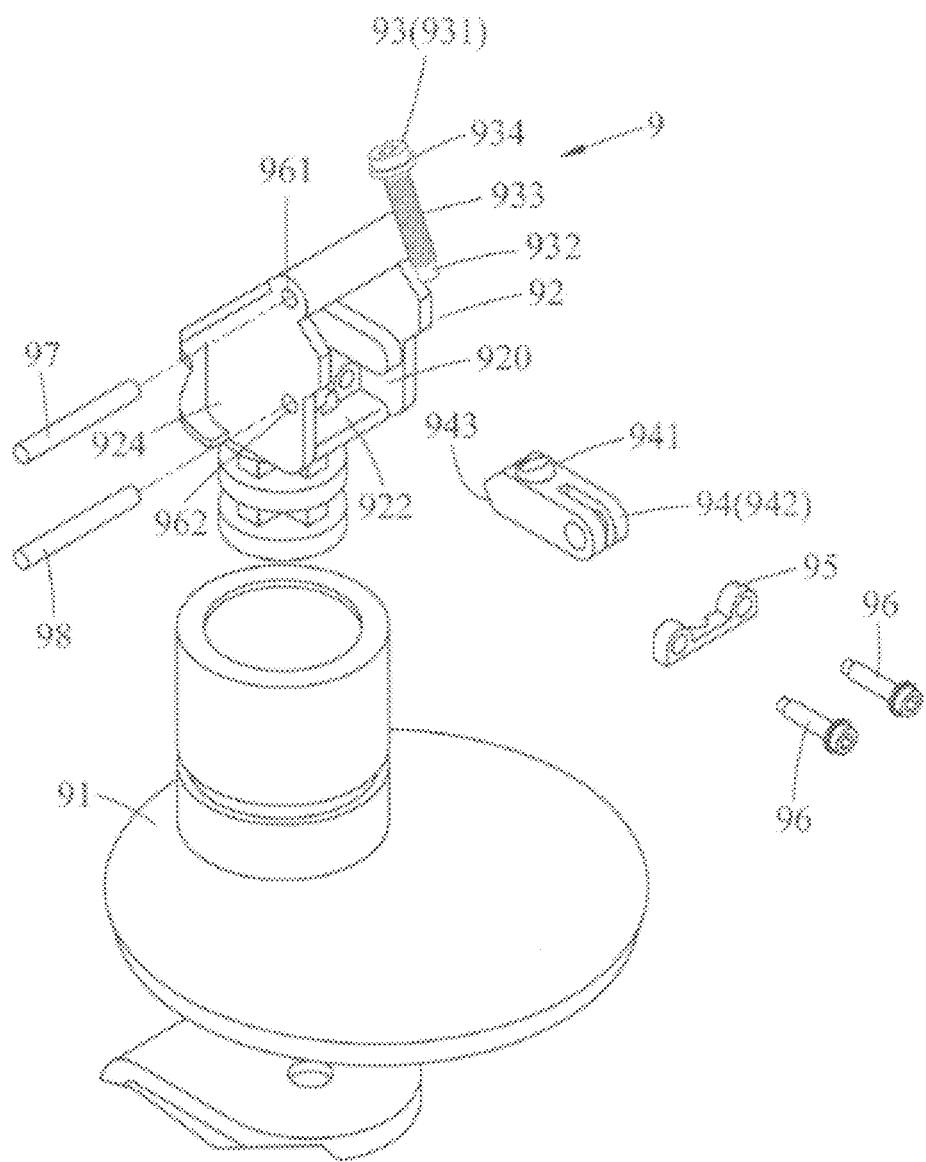
FIG. 1 is an exploded perspective view illustrating a hydraulic system of a cantilever device in the prior art that is also suitable for arranging on a base.
Figure 2:
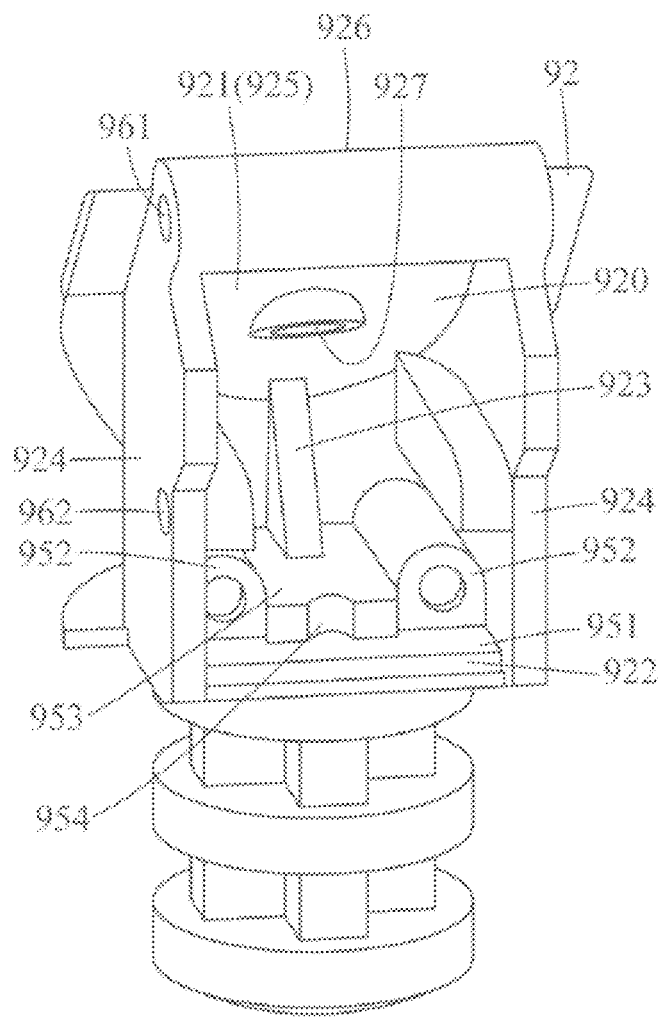
FIG. 2 is a perspective view illustrating an end cap of the hydraulic system in the prior art.
Figure 3:
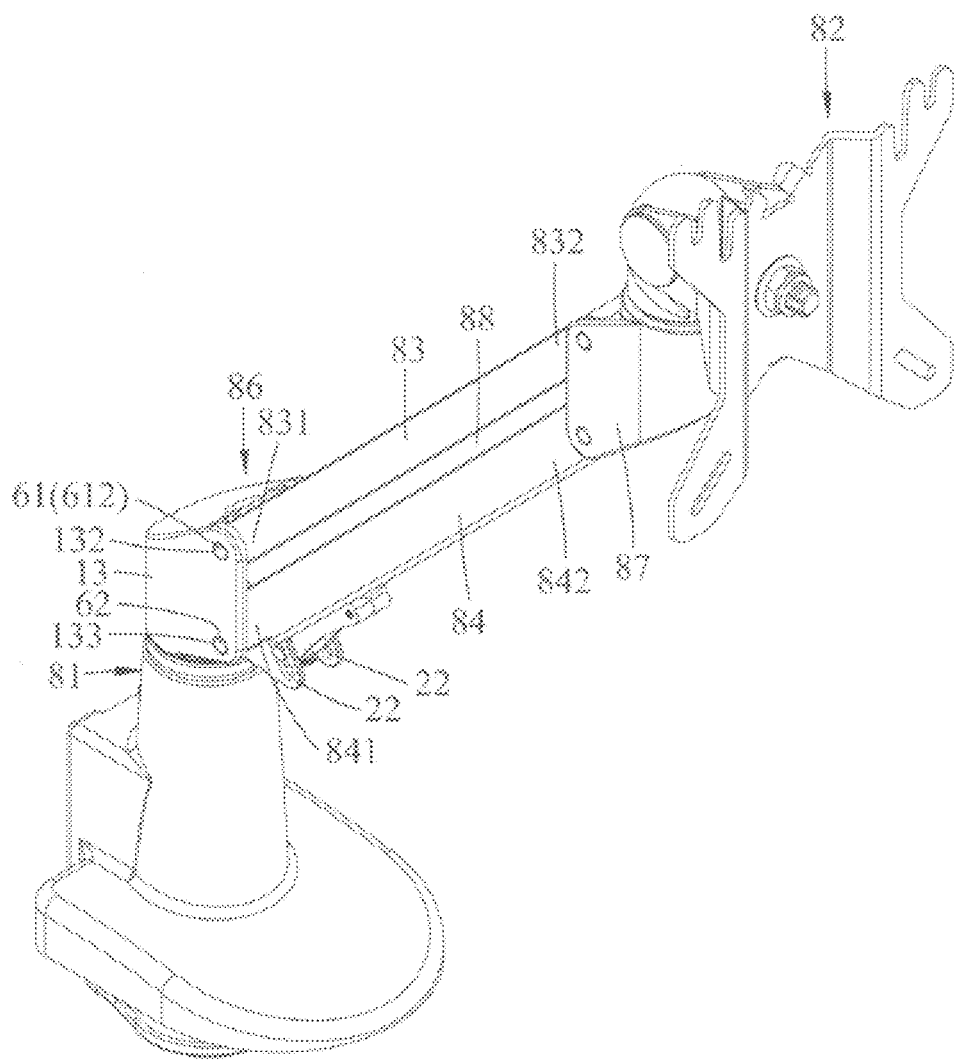
FIG. 3 is an assembled view illustrating an embodiment of a cantilever device of the present disclosure.
Figure 4:
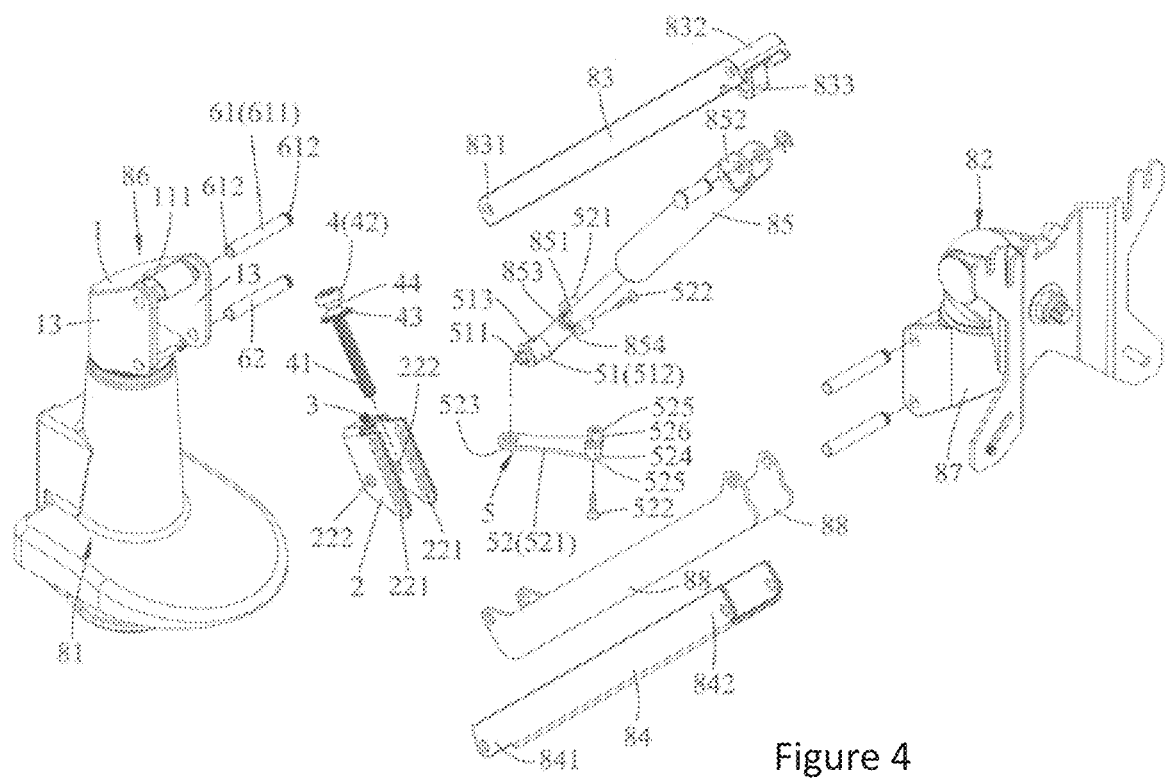
FIG. 4 is an exploded perspective view of the embodiment of the present disclosure.

With reference to FIGS. 3 and 4, an embodiment of the cantilever device of the present disclosure is suitable for arranging on a base 81 and connecting to a tilter assembly 82. The cantilever device includes a top support 83, a bottom support 84, a force adjustment device 85, a hydraulic system 86 for connecting the top support 83 and the bottom support 84 to the force adjustment device 85 and a connector piece 87. Preferably, the cantilever device may further include two shield plates 88 that are oppositely arranged and located between the top support 83 and the bottom support 84. Both sides of each shield plate 88 are respectively pivoted to the hydraulic system 86 and the connector piece 87, thereby hiding the force adjustment device 85 so as to create a more visually appealing effect.

The top support 83 comprises two ends 831 and 832 that are arranged oppositely and a pivot 833 located between the ends 831 and 832.

The bottom support 84 and the top support 83 are arranged longitudinally opposite to each other. The bottom support 84 comprises two ends 841 and 842 that are arranged oppositely. One end 842 of the ends 841 and 842 is pivoted to the connector piece 87 and the other end 841 of the ends 841 and 842 is pivoted to the hydraulic system 86.

Figure 6:
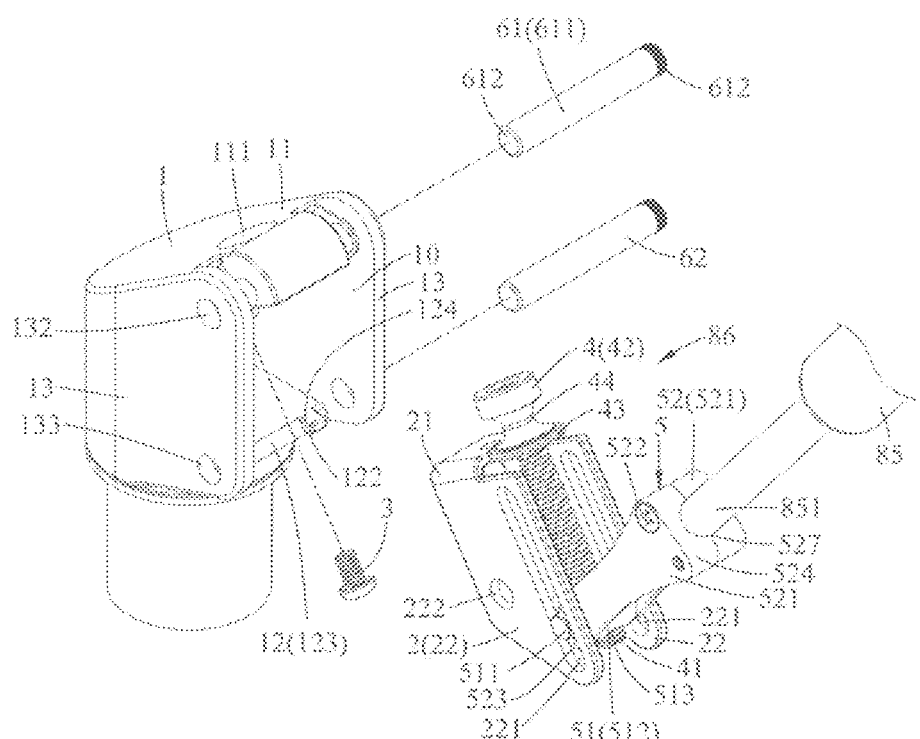
FIG. 6 is a partially exploded perspective view illustrating an end connection between a slider and a force adjustment device of the embodiment of the present disclosure.
Figure 7:
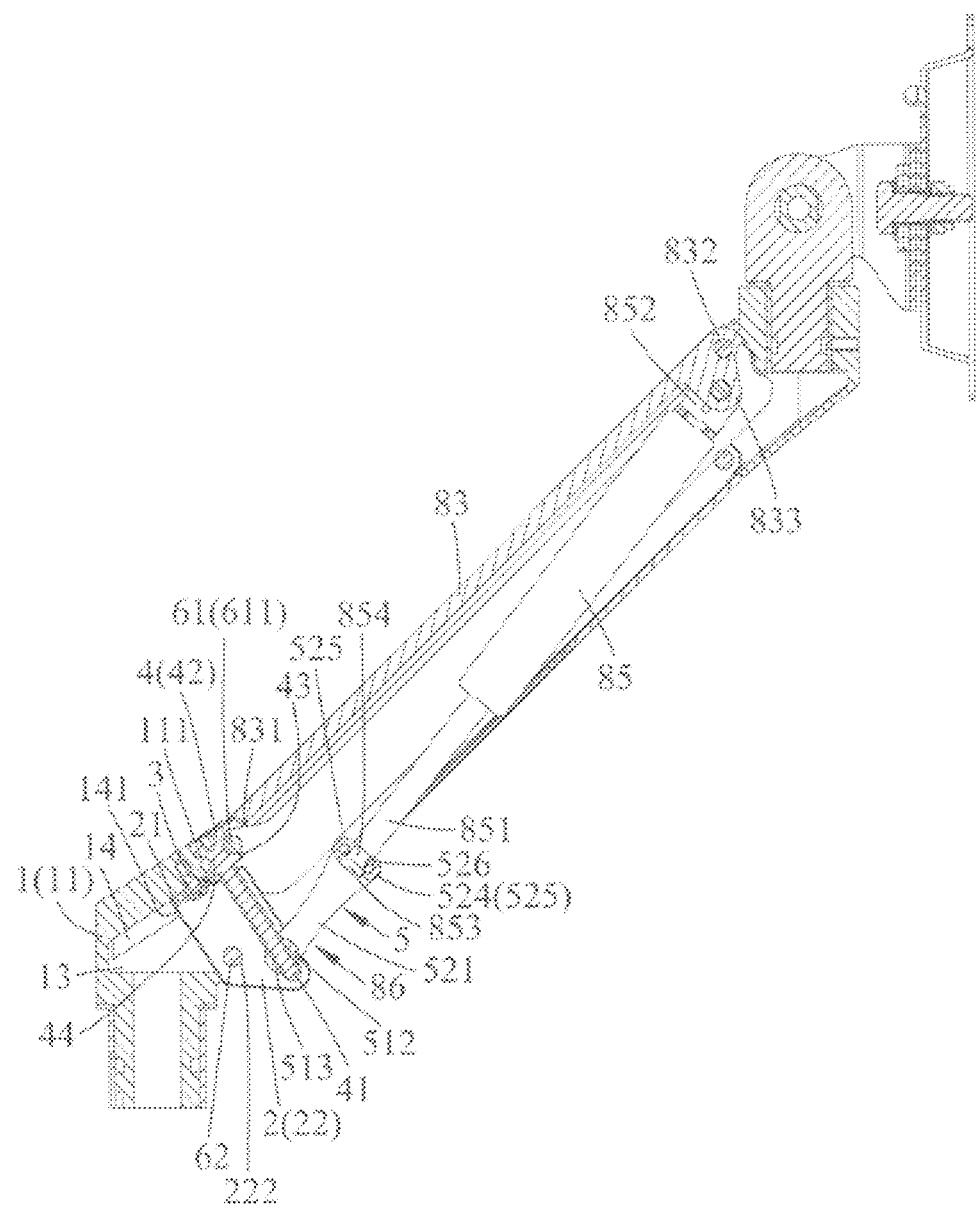
FIG. 7 is a cross sectional view illustrating that a first slider portion of the slider of the embodiment of the present disclosure is screwed to a hydraulic screw bolt and is adjacent to a bottom wall of the end cap.

With reference to FIGS. 4, 6, and 7, the force adjustment device 85 comprises two ends 851 and 852 arranged oppositely. One end 852 is pivoted to the pivot 833 of the top support 83 and the other end 851 is connected to the hydraulic system 86. The end 851 of the force adjustment device 85 connected to the hydraulic system 86 has a catching portion 853 and a narrow groove portion 854 connected to the catching portion 853 and having an outer diameter smaller than that of the catching portion 853.

Figure 5:
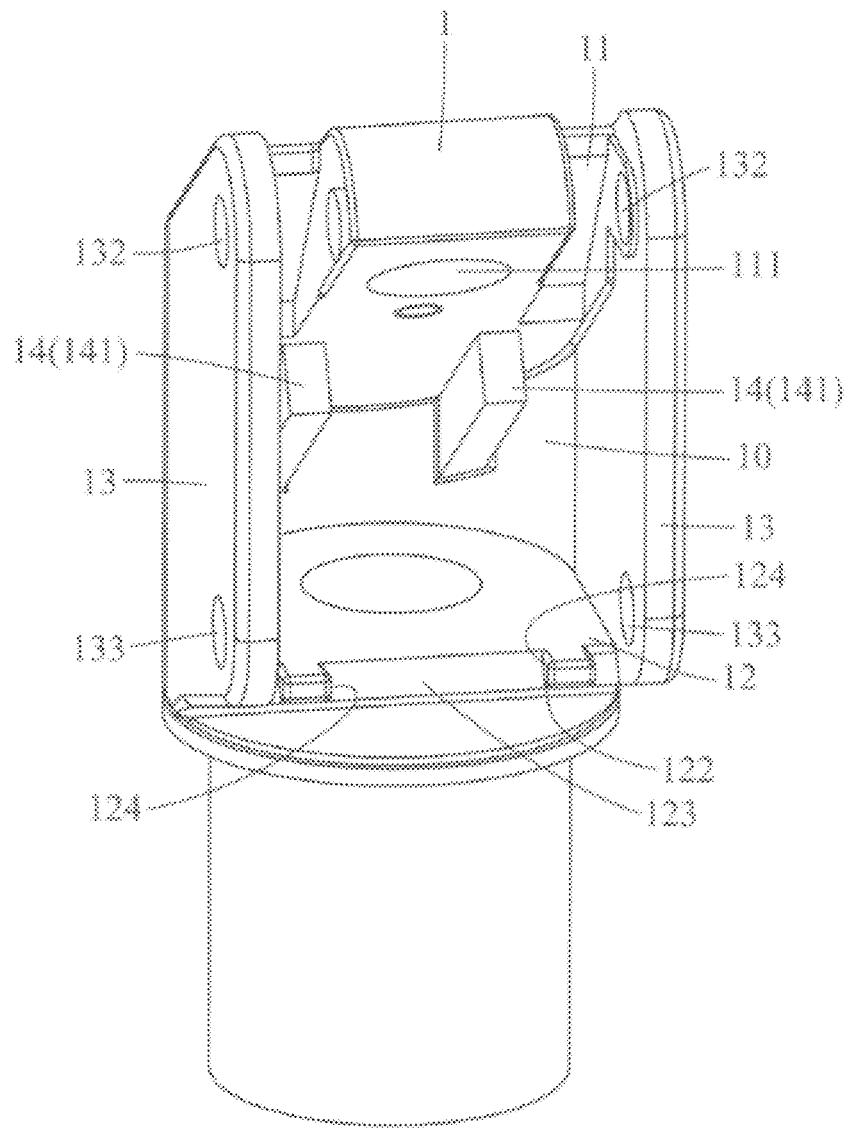
FIG. 5 is a perspective view of the end cap of the embodiment of the present disclosure.

With reference to FIGS. 4, 5, and 6, the hydraulic system 86 comprises an end cap 1 having an opening 10, an adjustment brace 2, a screw 3, an adjustment bolt 4, a slider 5, an upper pivot 61, and a lower pivot 62.

The end cap 1 is rotatably arranged on the base 81. The end cap 1 comprises an upper wall 11 and a bottom wall 12, fitted to define the opening 10, and two side walls 13 that are arranged oppositely and connecting the upper wall 11 to the bottom wall 12.

The upper wall 11 has a through hole 111 communicating with the opening 10. The bottom wall 12 has a securing groove 122 communicating with the opening 10. The securing groove 122 of the bottom wall 12 is defined by a securing face 123 facing the opening 10 and two limiting faces 124 that are spaced apart and both extend outward from the securing face 123. Each side wall 13 has an upper pivot hole 132 adjacent to the upper wall 11 and a lower pivot hole 133 adjacent to the bottom wall 12. In this embodiment, the end cap 1 further comprises two positioning protrusions 14 that are respectively connected to the bottom of the upper wall 11, and each positioning protrusion 14 has a stopping face 141 facing the opening 10.

With reference to FIGS. 4, 6, and 7, the adjustment brace 2 is fastened to the end cap 1, passes through the opening 10, and is secured in the securing groove 122 of the end cap 1. The adjustment brace 2 comprises a top surface 21 which is fastened to the end cap 1, and two track surfaces 22 which are connected to the top surface 21 and are spaced apart. Each track surface 22 has an elongated track slot 221 and a hole 222 which corresponds to the lower pivot holes 133 and is spaced apart from the respective track slot 221. In this embodiment, the top surface 21 of the adjustment brace 2 is stopped on the stopping faces 141 of the positioning protrusions 14 and the track surfaces 22 of the adjustment brace 2 are abutted respectively against the limiting faces 124 of the end cap 1. Such a design enables the shaking of the adjustment brace 2 between the side walls 13 to be avoided because the adjustment brace 2 is reliably abutted against and secured on the end cap 1. The screw 3 passes through the top surface 21 of the adjustment brace 2 to enable the adjustment brace 2 to be fixed on the upper wall 11 of the end cap 1 such that the adjustment brace 2 can be arranged steadily on the end cap 1. It should be noted that the method by which the adjustment brace 2 is fastened to the end cap 1 is not particularly limited to screw locking. For example, the method can also be adhesive bonding or the adjustment brace 2 and the end cap 1 can even be designed to be integral.

The adjustment bolt 4 comprises successively a bolt head 42, a bolt neck 44, a bolt shoulder 43, and an adjustment portion 41. The adjustment portion 41 is located between the track surfaces 22. In this embodiment, the outer diameter of the bolt neck 44 is smaller than the outer diameters of the bolt head 42 and the bolt shoulder 43.

The slider 5 of the hydraulic system 86 is connected to an end 851 of the force adjustment device 85. The slider 5 comprises a first slider portion 51 which is screwed to the adjustment portion 41 and a second slider portion 52 which connects the first slider portion 51 to the force adjustment device 85.

The first slider portion 51 has two shaft portions 511 which are located respectively on both sides of the adjustment portion 41 and a body portion 512 which is located between the shaft portions 511. The body portion 512 of the first slider portion 51 has a screw hole 513 which is screwed to the adjustment portion 41. The shaft portions 511 move up and down in the track slots 221 along with the rotation of the adjustment bolt 4.

The second slider portion 52 has two slider bodies 521 arranged oppositely and two screws 522 for combining the slider bodies 521. Each slider body 521 has a first end 523 for each of the shaft portions 511 to pass through and a second end 524 opposite to the first end 523 and connected to the other end 851 of the force adjustment device 85. Each second end 524 has two catching portions 525 spaced apart and a half groove 526 located between the catching portions 525. The half grooves 526 fit to form a catching groove 527 for receiving the narrow groove portion 854 of the end 851 of the force adjustment device 85 adjacent to the slider 5.

With reference to FIGS. 3, 4 and 7, the upper pivot 61 is used for enabling one of the ends 831 of the top support 83 to pivot to the end cap 1. The upper pivot 61 comprises a shaft body portion 611 which is located between the bolt head 42 and the bolt shoulder 43 of the adjustment bolt 4 and two shaft end portions 612 which are respectively located on both sides of the shaft body portion 611 and respectively pass through the upper pivot holes 132.

The lower pivot 62 is used for enabling one of the ends 841 of the bottom support 84 to pivot to the end cap 1. Specifically, the lower pivot 62 passes through the lower pivot holes 133 and the holes 222.

The connector piece 87 is used for connecting to the tilter assembly 82. The connector piece 87 is opposite to the end cap 1 of the hydraulic system 86 and is pivoted to an end portion 832 of the top support 83 and an end portion 842 of the bottom support 84.

With reference to FIGS. 4, 5, 6 and 7, when assembled, the track surfaces 22 of the adjustment brace 2 are abutted respectively against the limiting faces 124 of the end cap 1, and the adjustment brace 2 is locked to the upper wall 11 of the end cap 1 through the screw 3; then, the pivot 833 of the top support 83 is pivoted to one of the ends 852 of the force adjustment device 85, the catching portion 853 of the force adjustment device 85 is caught by the catching portions 525 of one of the slider bodies 521 of the second slider portion 52, and the narrow groove portion 854 of the force adjustment device 85 is received in the half groove 526 of the slider body 521; then one of the shaft portions 511 of the first slider portion 51 is passed through the first end 523 of the slider body 521, and the other slider body 521 of the second slider portion 52 is aligned through the screws 522 with the slider body 521 which has been provided with the force adjustment device 85 and the first slider portion 51, in order to combine the slider bodies 521 such that the narrow groove portion 854 of the force adjustment device 85 can be received within the catching groove 527 of the slider 5; then, the catching portions 525 of the slider 5 are used for the catching portion 853 of the force adjustment device 85 to catch, so as to prevent the force adjustment device 85 from detaching from the slider 5 axially outward; then, the adjustment bolt 4 is screwed to the body portion 512 of the first slider portion 51, the shaft portions 511 of the first slider portion 51 of the slider 5 are received in the track slots 221 respectively, and then the bolt neck 44 of the adjustment bolt 4 is received in the through hole 111 of the end cap 1; and finally, one of the ends 831 and 832 of the top support 83, the end 832, is pivoted to the connector piece 87, while the other end 831 is pivoted to the end cap 1 through the upper pivot 61, and the ends 841 and 842 are respective pivoted to the end cap 1 and the connector piece 87 such that the assembly operation of the cantilever device based on the basic operating principle of four-bar linkage can be completed. As a supplementary explanation, the shield plates 88 are not mentioned in the above assembly process because the shield plates 88 are not essential elements for the cantilever device to achieve an action. But how to pivot each shield plate 88 to the end cap 1 and the connector piece 87 is a simple technique which is well known to those skilled in the art, and thus detailed description thereof will be omitted.

Figure 8:
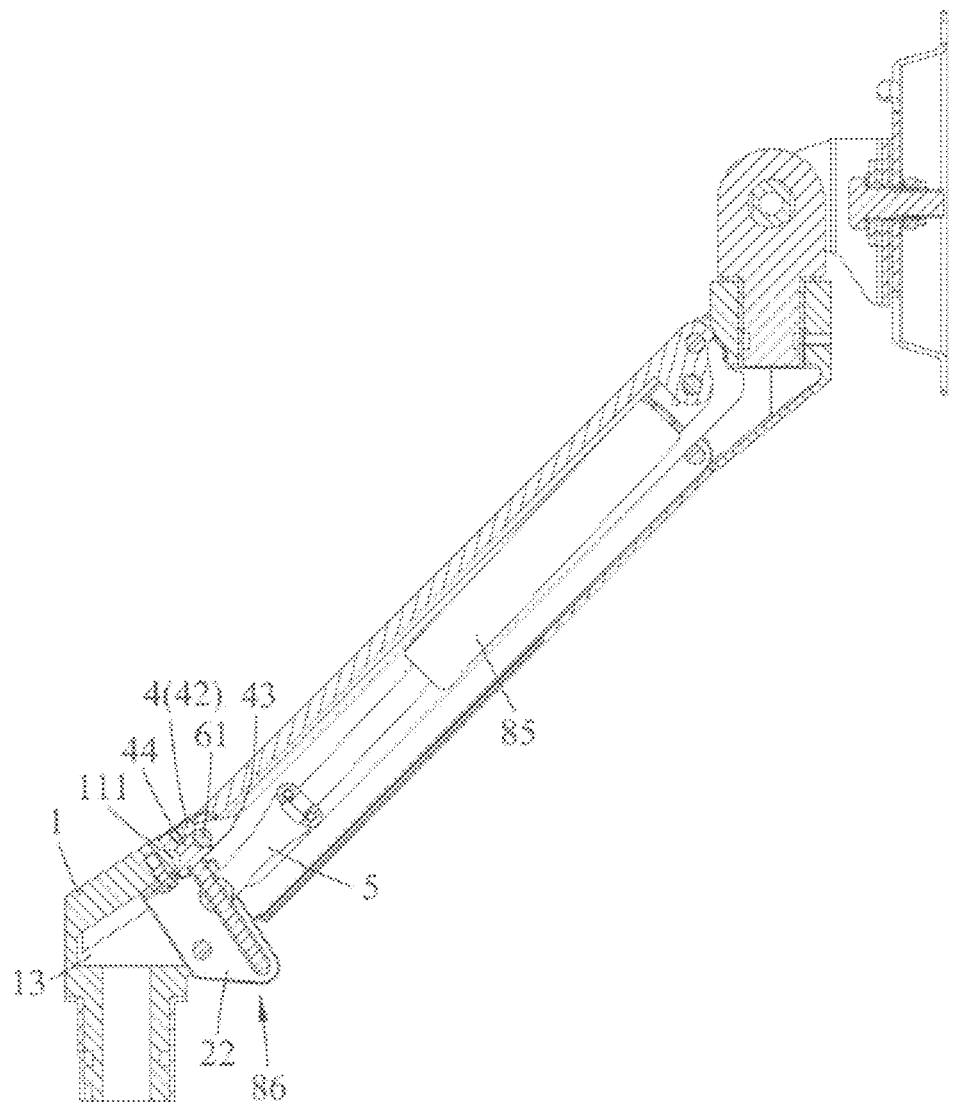
FIG. 8 is a cross sectional view similar to FIG. 7, illustrating that the first slider portion of the end cap of the embodiment of the present disclosure is screwed to the hydraulic screw bolt and is adjacent to an upper wall of the end cap.

With reference to FIGS. 3, 7 and 8, when in use, the adjustment bolt 4 can be rotated by the user through a hand tool (not shown) extended into the bolt head 42 of the adjustment bolt 4 such that the slider 5, which is connected to the force adjustment device 85, can be moved up and down along the axial direction of the adjustment bolt 4. In detail, the track surfaces 22 of the adjustment brace 2 of the hydraulic system 86 are abutted respectively against the limiting faces 124 of the end cap 1. Such a design enables the adjustment brace 2 to be arranged on the end cap 1 steadily instead of being shaken between the side walls 13 (i.e., in a horizontal direction) so that the slider 5, which moves on the adjustment brace 2, does not shake horizontally. Thus, the slider 5 is secured to move only along the axial direction of the adjustment bolt 4, which further improves the disadvantage of the existing hydraulic system 9 in which noise is produced upon use due to the loose arrangement of the essential elements.

Through the above description, the advantages of the cantilever device of the present disclosure can be summarized as follows:

1. The adjustment bolt 4 of the present disclosure has a design which allows the bolt neck 44 to be located at the through hole 111 of the end cap 1 and the outer diameter of the bolt neck 44 to be smaller than the outer diameters of the bolt head 42 and the bolt shoulder 43. This design enables the adjustment bolt 4 to be limited to the end cap 1 only by passing the upper pivot 61 through the upper pivot hole 132 upon assembly of the present disclosure. Compared to the design of the existing hydraulic system 9 where the adjustment bolt 93 thereof is abutted between the inner surface 925 of the end cap 92 and the bottom wall 922, the intelligent design of the present disclosure, which allows the adjustment bolt 4 to be directly connected to the end cap 1 through the upper pivot 61, not only eliminates the need of additional processing of the end of the adjustment bolt 4 of the present disclosure for a smooth surface (for the reason that the end of the adjustment bolt 4 of the present disclosure is not contacted with other elements), but also omits the fixing plate 95 and the bolt 96 of the existing hydraulic system 9 which are used for limiting the end 932 of the adjustment bolt 93. Thus, the intelligent design of the present disclosure reduces the manufacturing cost.

2. The second end 942 of the slider 94 of the existing hydraulic system 9 is pivoted mutually to the existing force adjustment device so that an additional drilling operation is needed by the end of the force adjustment device applied to the slider 94 and accurate aligning is needed to complete the assembly. The slider 5 of the hydraulic system 86 of the present disclosure is of combined type and the second slider portion 52 of the slider 5 is of face-to-face combined two-piece design. Thus, the end of the force adjustment device 85 requires no additional drilling operation while the assembly is convenient without excessive time spent on accurate aligning.

3. The elements of the hydraulic system 86 of the present disclosure are tightly fitted (the slider 5 does not shake horizontally) so that the cantilever device of the present disclosure produces no unnecessary shaking noise in use like the noise produced by the existing slider 94 for no limiting fixing is applied thereto between the side walls 924.

4. The overall structure of the present disclosure is simple and is thus easy to manufacture.

In view of the above, the cantilever device and the hydraulic system 9 thereof of the present disclosure can reliably achieve the objects of the present disclosure.

Embodiments described above are merely embodiments of the present disclosure and are not limiting the scope of the present disclosure. Any simple equivalent variations or modifications of the present disclosure according to the claim and the contents of the specification of the present disclosure are contemplated within the scope of the present disclosure.

The invention claimed is:

1. A cantilever device, the cantilever device comprising:
a top support comprising two top-support ends arranged oppositely to each other and a pivot located between the two top-support ends;
a force adjustment device comprising two ends arranged oppositely to each other and one of the ends is pivoted to the pivot of the top support; and
a hydraulic system comprising an adjustment brace with a top surface and two track surfaces connecting the top surface and spaced apart, an adjustment bolt, and a slider with a first slider portion and a second slider portion,
wherein an end cap, which is with an opening and a securing groove, is fastened to the top surface of the adjustment brace,
wherein the adjustment brace passes through the opening of the end cap and is secured in the securing groove of the end cap,
wherein the first slider portion of the slider is movably fixed to two track slots of the adjustment brace, each track slot located on the track surfaces respectively, wherein the second slider portion of the slider is fixed to the other end of the force adjustment device, wherein the adjustment bolt adjusts the first slider portion along the track slots.

2. The cantilever device according to claim 1, wherein the securing groove of the end cap of the hydraulic system is defined by a securing face facing the opening and two limiting faces spaced apart from each other and both extending outward from the securing face, wherein each track surface of the adjustment brace is abutted against the limiting faces respectively.

3. The cantilever device according to claim 1, wherein the end cap of the hydraulic system further comprises two positioning protrusions attached to an upper wall of the end cap respectively, each positioning protrusion has a stopping face facing the opening, wherein the top surface of the adjustment brace is stopped on the stopping faces.

4. The cantilever device according to claim 3, wherein the first slide portion of the slider is fastened to the adjustment portion, the first slide portion comprising two shaft portions located on both sides of the adjustment portion, wherein the shaft portions are configured to move up and down on the track slots respectively along with rotation of the adjustment bolt.

5. The cantilever device according to claim 4, wherein each second end comprises two catching portions spaced apart and a half groove located between the catching portions, the catching portions of the second ends are configured to fix the force adjustment device to the slider.

6. The cantilever device according to claim 3, wherein the cantilever device further comprising an upper pivot, wherein the upper pivot comprises a shaft body portion located between the bolt head and the bolt shoulder of the adjustment bolt, the shaft body portion having two shaft end portions located on both ends of the shaft body portion respectfully.

7. The cantilever device according to claim 1, wherein the adjustment bolt comprises a bolt head, a bolt neck, a bolt shoulder, and an adjustment portion, wherein the adjustment portion is located between the track surfaces of the adjustment brace, wherein an outer diameter of the bolt neck is smaller than outer diameters of the bolt head and the bolt shoulder.

8. The cantilever device according to claim 7, wherein the first slider portion of the hydraulic system further comprises a body portion located between the shaft portions, the body portion comprising a fastening hole for receiving the adjustment portion, the second slider portion comprises two slider bodies arranged oppositely and fastened together, each slider body comprising a first end for each of the shaft portion to pass through and a second end opposite to the first end wherein the second end is connected to the force adjustment device.

9. The cantilever device according to claim 8, wherein the end of the force adjustment device connected to the hydraulic system comprises a narrow groove portion, wherein the half grooves of the second ends fit to form a catching groove for receiving the narrow groove portion of the force adjustment device.

10. The cantilever device according to claim 9, wherein the cantilever device further comprises a lower pivot for pivoting the bottom support at the end cap, wherein each side wall of the end cap comprises a lower pivot hole adjacent to the bottom wall, wherein each track surface of the adjustment brace further comprises a hole corresponding to the lower pivot holes and spaced apart from the respective track slot, wherein the lower pivot passes through the lower pivot holes and the holes.

11. The cantilever device according to claim 1, wherein the cantilever device further comprising a bottom support arranged oppositely to the top support, wherein the bottom support comprises two bottom-support ends arranged oppositely, one of the bottom-support ends of the bottom support is pivoted to the end cap.

12. The cantilever device according to claim 11, wherein each side wall of the end cap comprises an upper pivot hole adjacent to the upper wall and the two shaft end portions pass through upper pivot holes respectively.

* * * * *